United States Patent
Sadafal et al.

(10) Patent No.: US 11,902,597 B2
(45) Date of Patent: Feb. 13, 2024

(54) MEDIA AWARE CONTENT PLACEMENT (71) Applicant: Netflix, Inc., Los Gatos, CA (US)

(72) Inventors: Videsh Sadafal, Omaha, NE (US); Ishaan Shastri, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 90 days.

(21) Appl. No.: 17/172,017

(22) Filed: Feb. 9, 2021

(65) Prior Publication Data
US 2022/0256208 A1 Aug. 11, 2022

(51) Int. Cl.
*H04N 21/231* (2011.01)
*G06F 3/06* (2006.01)
*H04N 21/218* (2011.01)
*H04N 21/2312* (2011.01)

(52) U.S. Cl.
CPC ..... *H04N 21/23103* (2013.01); *G06F 3/0613* (2013.01); *G06F 3/0647* (2013.01); *G06F 3/0688* (2013.01); *G06F 3/0689* (2013.01); *H04N 21/2181* (2013.01); *H04N 21/2312* (2013.01)

(58) Field of Classification Search
None
See application file for complete search history.

(56) References Cited

U.S. PATENT DOCUMENTS

| 2011/0191439 | A1* | 8/2011 | Dazzi | G06F 16/40 709/217 |
| 2015/0304420 | A1* | 10/2015 | Li | H04L 67/1097 709/201 |
| 2016/0283140 | A1* | 9/2016 | Kaushik | G06F 3/061 |
| 2017/0286008 | A1* | 10/2017 | Kim | G06F 3/0685 |

* cited by examiner

*Primary Examiner* — Jefferey F Harold
*Assistant Examiner* — Charles N Hicks
(74) *Attorney, Agent, or Firm* — Greenberg Traurig, LLP (57) ABSTRACT

The disclosed computer-implemented method includes accessing cluster hardware information that identifies at least two different types of storage media within a cluster and provides an indication of a respective amount of data throughput for each identified type of storage media. The method next includes accessing popularity information for digital content that is to be stored in the cluster. The popularity information indicates how often the digital content is predicted to be accessed over a specified future period of time. The method also includes allocating the digital content on the different types of storage media within the cluster according to the popularity information. Accordingly, digital content predicted to have higher popularity is placed on storage media types with higher throughput amounts, and digital content predicted to have lower popularity is placed on storage media types with lower throughput amounts. Various other methods, systems, and computer-readable media are also disclosed.

20 Claims, 8 Drawing Sheets

MEDIA AWARE CONTENT PLACEMENT

BACKGROUND

Users of electronic devices such as computers and cell phones generate large amounts of data. Commercial enterprises, governments, universities, and other institutions also contribute to an ever-growing volume of digital data. This digital data is typically stored on magnetic, optical, or tape storage media. Of these different storage media, however, digital data is most often stored on solid state drives (SSDs) and hard disk drives (HDDs). Indeed, many of today's cloud data centers implement vast arrays of SSDs or HDDs to store digital data. These different types of storage media have different characteristics, including storage capacity and throughput. SSDs tend to have much higher throughput than HDDs, but have much smaller storage capacity and are considerably more expensive.

Previous digital storage solutions were typically unsophisticated in nature. The storage systems would look at the total amount of storage space in a given cluster and would assign data to that cluster based on the total amount of capacity available. Because of this, storage clusters that had large amounts of available storage space would attract more incoming digital data. These large storage clusters, however, while capable of holding and serving large amounts of data, are often slow to read and serve that data upon receiving data requests from users. Moreover, higher-speed data storage such as SSDs may remain underutilized while a majority of the data is stored on slower HDD storage clusters.

SUMMARY

As will be described in greater detail below, the present disclosure describes methods and systems for determining where and how to store digital data based on a predicted popularity measure for that data.

In one example, a computer-implemented method for storing content according to storage media type includes accessing cluster hardware information that identifies at least two different types of storage media within a cluster and provides an indication of a respective amount of data throughput for each identified type of storage media. The method also includes accessing popularity information for various portions of digital content that are to be stored in the cluster. The popularity information indicates how often the digital content is predicted to be accessed over a specified future period of time. The method further includes allocating the digital content on the different types of storage media within the cluster according to the popularity information. As such, digital content predicted to have higher popularity is placed on storage media types with higher throughput amounts according to the cluster hardware information, and digital content predicted to have lower popularity is placed on storage media types with lower throughput amounts, as indicated by the cluster hardware information.

In some examples, one of the at least two different types of storage media within the cluster includes solid state drives (SSDs). In some embodiments, one of the at least two different types of storage media within the cluster includes hard disk drives (HDDs). In some cases, multiple SSDs from a first cluster and multiple HDDs from a second cluster are merged into the cluster onto which the digital content is to be stored.

In some examples, the method further includes calculating the popularity information according to various data popularity criteria. In some cases, the data popularity criteria apply to multiple different clusters of storage media. In some embodiments, the data popularity criteria are specific to the cluster onto which the digital content is to be stored. In some cases, the digital content is placed on the different types of storage media proactively before receiving measured popularity data indicating actual data access rates for the digital content.

In some examples, proactive placement of the digital content according to the predicted popularity information avoids movement of the digital content between storage media types. In some cases, proactive placement of the digital content according to the predicted popularity information avoids movement of the digital content across storage clusters.

In addition, a corresponding system for storing content according to storage media type includes at least one physical processor and physical memory comprising computer-executable instructions that, when executed by the physical processor, cause the physical processor to: access cluster hardware information that identifies at least two different types of storage media within a cluster and provides an indication of a respective amount of data throughput for each identified type of storage media, access popularity information for various portions of digital content that are to be stored in the cluster, where the popularity information indicates how often the digital content is predicted to be accessed over a specified future period of time, and allocate the digital content on the at least two different types of storage media within the cluster according to the popularity information, such that digital content predicted to have higher popularity is placed on storage media types with higher throughput amounts according to the cluster hardware information, and digital content predicted to have lower popularity is placed on storage media types with lower throughput amounts, as indicated by the cluster hardware information.

In some cases, the digital content is allocated on the different types of storage media within the cluster according to one or more linear programming optimizations. In some examples, the digital content is replicated on the different types of storage media within the cluster in a manner that allows load-balancing between cluster nodes.

In some embodiments, the digital content is replicated on the different types of storage media within the cluster in a manner that allows fault tolerance across a plurality of storage media clusters. In some cases, the system sends a request for hardware information to the cluster and receives a reply identifying the at least two different types of storage media within the cluster.

In some cases, the amount of data throughput for each identified type of storage media comprises a current, real-time throughput measurement for each identified type of storage media. In some examples, the digital content is proactively cached on the different types of storage media within the cluster according to the popularity information. In some embodiments, a first cluster comprising SSDs is merged with a second cluster comprising both SSDs and HDDs. In such cases, the SSD storage media and the HDD storage media are used simultaneously within the combined first and second clusters. In some cases, allocating the digital content on the first and second clusters avoids duplicating digital content stored on the SSDs of the first cluster on the SSDs of the second cluster.

In some examples, the above-described method may be encoded as computer-readable instructions on a computer-readable medium. For example, a computer-readable medium may include one or more computer-executable instructions that, when executed by at least one processor of a computing device, may cause the computing device to access cluster hardware information that identifies at least two different types of storage media within a cluster and provides an indication of a respective amount of data throughput for each identified type of storage media, access popularity information for various portions of digital content that are to be stored in the cluster, where the popularity information indicates how often the digital content is predicted to be accessed over a specified future period of time, and allocate the digital content on the at least two different types of storage media within the cluster according to the popularity information, such that digital content predicted to have higher popularity is placed on storage media types with higher throughput amounts according to the cluster hardware information, and digital content predicted to have lower popularity is placed on storage media types with lower throughput amounts, as indicated by the cluster hardware information.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to storing content according to storage media type and according to predicted popularity. As will be explained in greater detail below, embodiments of the present disclosure determine which types of storage media are available for storing digital data, and then allocate different types of data or different media items to the various available storage media types.

As noted above, digital data may be stored on a variety of different storage media types from tape drives to hard drives to optical drives to thumb drives or other storage media types. Traditional hard disk drives store digital data on spinning platters. Hard drives are relatively cheap to produce and provide a large amount of digital data storage (e.g., single hard drives may include four or more terabytes of data). Solid-state drives or other solid-state media (e.g., "Flash media" or "Flash drives" herein) are more expensive to produce and provide a much smaller amount of storage space (e.g., single SSD drives typically include around 500 GB-1 TB capacity). Moreover, solid-state drives (SSDs) are capable of reading and writing data (indicated as "throughput" herein) at a much higher rate than hard disk drives. Traditional storage systems that implement HDDs or DDS are designed to look only at total capacity when hosting data. They do not look to see which types of media (e.g., HDDs, SSDs, or other types (e.g., non-volatile memory express (NVMe)) will actually be used to store the data.

In contrast to these traditional systems, the embodiments described herein are designed to determine which storage types are currently available in a data store and then optimize data storage based on those identified media storage types. For example, if a data store were to host a large amount of digital content (e.g., media content), the creator and/or distributor of that content may want the more popular content to be stored on higher throughput storage media. For instance, if the data store were hosting digital content (e.g., movies or television shows), the creators of those movies or shows may want the most popular items to be stored on the high throughput SSD drives, and may be ok with less popular content being stored on lower throughput drives such as HDDs.

In most cases, however, the digital content will need to be placed on the data store storage media before any information can be gathered regarding the digital content's popularity. Thus, in the embodiments herein, the systems described not only determine which media types are available, and store data according to the various characteristics and abilities of those media types, but also predict which media items will be most popular and place those media items that are predicted to be the most popular on storage media types with the highest throughput. Then, if and when the anticipated demand hits, the high-throughput storage media will be ready to serve the most popular data to the highest number of people. These embodiments for predicting data popularity and storing data according to storage media type will be described in greater detail below with reference to FIGS. 1-10.

Figure 1:
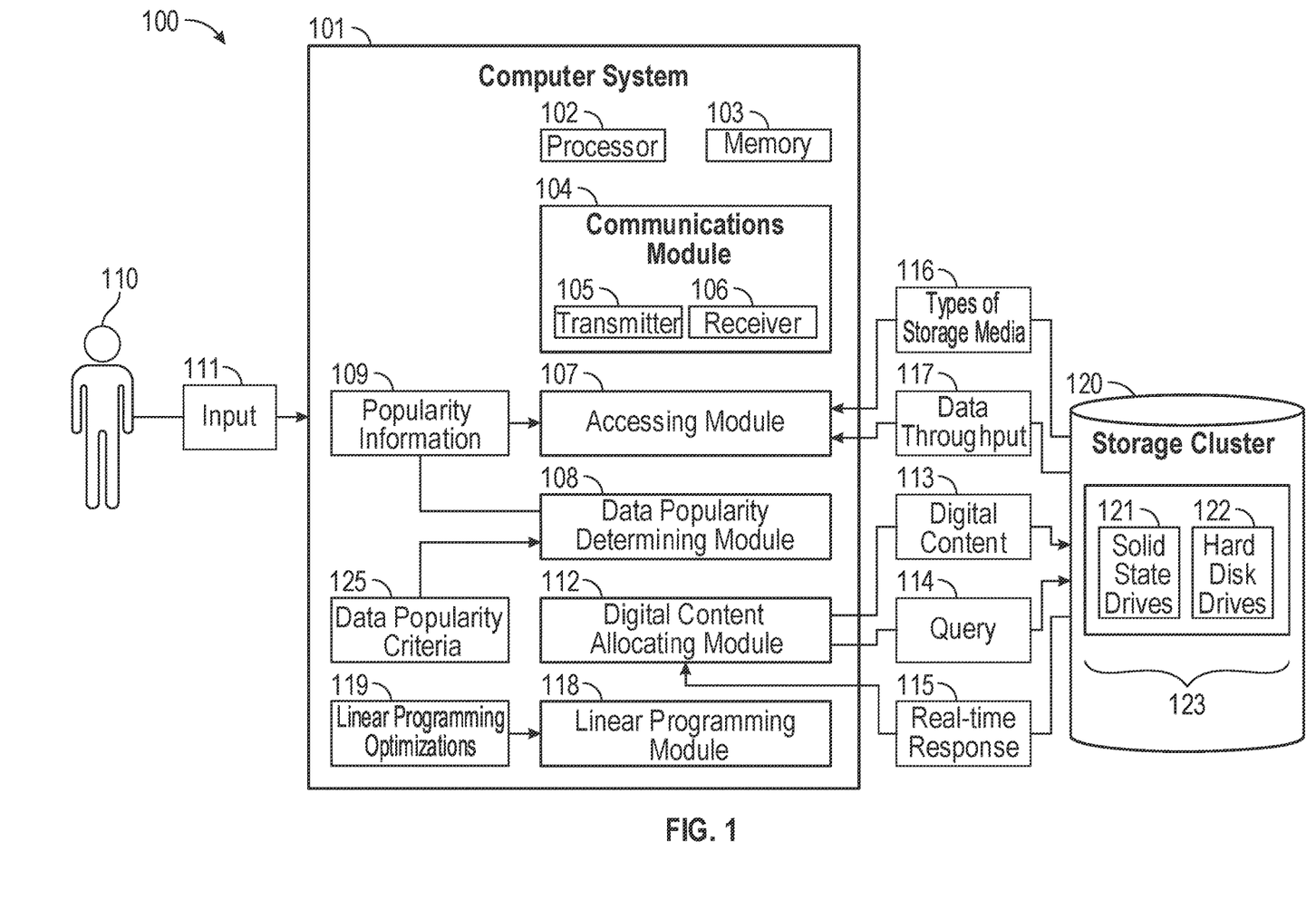
FIG. 1 illustrates a computing environment in which content is stored according to storage media type.

FIG. 1 illustrates a computing environment 100 in which digital content is stored according to storage media type and according to predicted popularity. FIG. 1 includes various electronic components and elements including a computer system 101 that is used, alone or in combination with other computer systems, to perform tasks associated with storing digital content. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes an accessing module 107. The accessing module 107 is configured to access the storage cluster 120. The storage cluster 120 includes one or more hardware storage devices including, but not limited to, hard disk drives (HDDs), solid-state drives (SSDs), non-volatile memory express (NVMe) media, optical discs, thumb drives, tape drives, or other types of data storage media. In some cases, the storage cluster 120 includes a single type of storage media, and in other cases, the storage cluster 120 includes multiple different types of storage media. Indeed, as shown in FIG. 1, the storage cluster 120 includes one or more solid state drives 121 and one or more hard disk drives 122. These SSDs 121 and HDDs 122 make up the storage media 123 of the storage cluster 120.

The accessing module 107 of computer system 101 is configured to communicate with the storage cluster 120 to determine which types of storage media are being used on the storage cluster. The storage cluster 120 responds to the communication by providing an indication of which types of storage media 116 are being used. In some cases, the storage cluster 120 also provides an indication of data throughput rates 117 for the various types of data storage media. The data throughput rates indicate, for example, how many bits of data per second (bps) each drive or each bank of drives can provide. This information is then used by the other modules of the computer system 101 in their various calculations.

The data popularity determining module 108 of computer system 101 is configured to predict how popular a given media item will be. Whether that media item is a movie title, a television title, a musical piece, a data file, or other media item, the data popularity determining module 108 is configured to determine (prior to placement on the storage cluster 120) how often and/or by how many people that media item will be accessed once it is made available (e.g., via streaming or downloading). The data popularity determining module 108 uses popularity information 109 and/or data popularity criteria 125 to determine how popular a given media item will be. The data popularity criteria 125 provide indicators such as how popular similar titles have been, or who is producing the media item, who is starring in or performing in the media item, etc. This data popularity criteria 125 thus informs the data popularity determining module 108 on how popular the media item will likely be. This, in turn, informs the digital content allocating module 112 on how to allocate the digital content 113 among the various SSDs 121 and HDDs 122 of the storage cluster 120. Other optimizations, including linear programming optimizations 119, are also implemented during and throughout this process by the linear programming module 118. Still further, the various calculations and functions performed by these modules of computer system 101 may be controlled or managed by a user such as an administrator 110 using input 111. These processes will be described in greater detail below with regard to method 200 of FIG. 2, as well as the embodiments illustrated in FIGS. 3-10.

Figure 2:
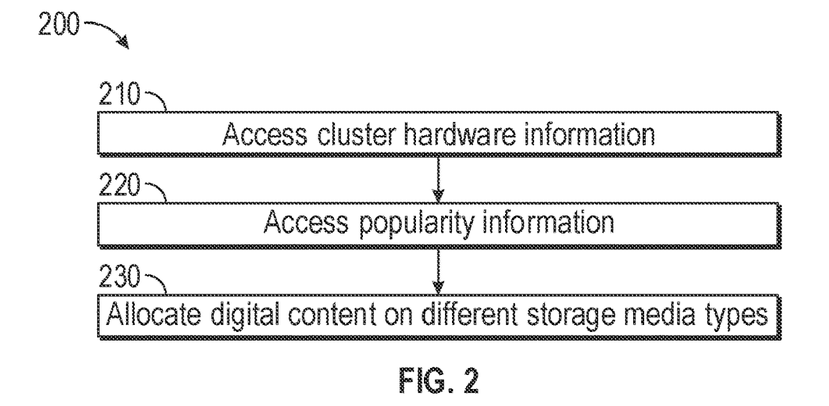
FIG. 2 is a flow diagram of an exemplary method for storing content according to storage media type and according to predicted popularity.

FIG. 2 is a flow diagram of an exemplary computer-implemented method 200 for store content according to storage media type. The steps shown in FIG. 2 may be performed by any suitable computer-executable code and/or computing system, including the systems illustrated in FIG. 1. In one example, each of the steps shown in FIG. 2 represents an algorithm whose structure includes and/or is represented by multiple sub-steps, examples of which will be provided in greater detail below.

As illustrated in FIG. 2, at step 210 one or more of the systems described herein accesses cluster hardware information that identifies at least two different types of storage media within a cluster and provides an indication of a respective amount of data throughput for each identified type of storage media. At step 220, the systems described herein access popularity information for various portions of digital content that are to be stored in the cluster. The popularity information indicates how often the digital content is predicted to be accessed over a specified future period of time. At step 230, the systems described herein allocate the digital content on the different types of storage media within the cluster according to the popularity information. In some cases, method 200 may further include steps of applying linear programming optimization to determine which proportion of popularity ranked content goes on which storage media, and applying consistent hashing to place digital content on similar media types to prevent churn. In such cases, these steps are performed before performing step 230 in which the digital content is allocated to the different types of storage media. Accordingly, in this manner, digital content predicted to have higher popularity is placed on storage media types with higher throughput amounts according to the cluster hardware information, and digital content predicted to have lower popularity is placed on storage media types with lower throughput amounts, as indicated by the cluster hardware information.

Thus, in at least one embodiment, the accessing module 107 of computer system 101 in FIG. 1 accesses cluster hardware information for storage cluster 120 identifying different types of storage media 116 that are used by the storage cluster 120. The accessing module 107 also receives or otherwise accesses data throughput rates 117 indicating the amount of data throughput for each of the identified types of storage media. In some embodiments, the storage cluster 120 includes solely SSDs, while in other embodiments, the storage cluster 120 includes solely HDDs, or solely some other type of storage media. Alternatively, in some cases, the storage cluster 120 includes a combination of different storage media types including a combination of SSDs 121, HDDs 122, and/or other types of storage media.

In some cases, for example, a cluster of SSDs may be merged with a cluster that has both SSDs and HDDs. In such cases, the SSDs and the HDDs are used simultaneously within the combined cluster. This optimizes the use of both types of digital content, and also avoids duplicating digital content that may have been stored on both the SSDs and HDDs. Thus, at least some embodiments are provided in which a plurality of SSDs 121 from a first cluster and a plurality of HDDs 122 from a second cluster are merged into and form the storage cluster 120 onto which the digital content 113 is to be stored.

The data popularity determining module 108 of computer system 101 is configured to access or generate popularity information 109 for the digital content 113 that is to be stored in the storage cluster 120. The popularity information 109 indicates, for example, how often the digital content 113 will be downloaded or streamed in a 24-hour period, or in a weeklong period, or over a month, or over some other specified future timeframe. In some cases, the popularity information is based on past streaming behavior and that the computer system 101 uses as a proxy to predict future behavior. For example, the computer system 101 may determine how many times the digital content 113 has been streamed or downloaded in the past 24 hours (or in the past week or month), and then use that information to determine the popularity of the content. In this manner, past usage is used as an indicator of future popularity.

Figure 3A:
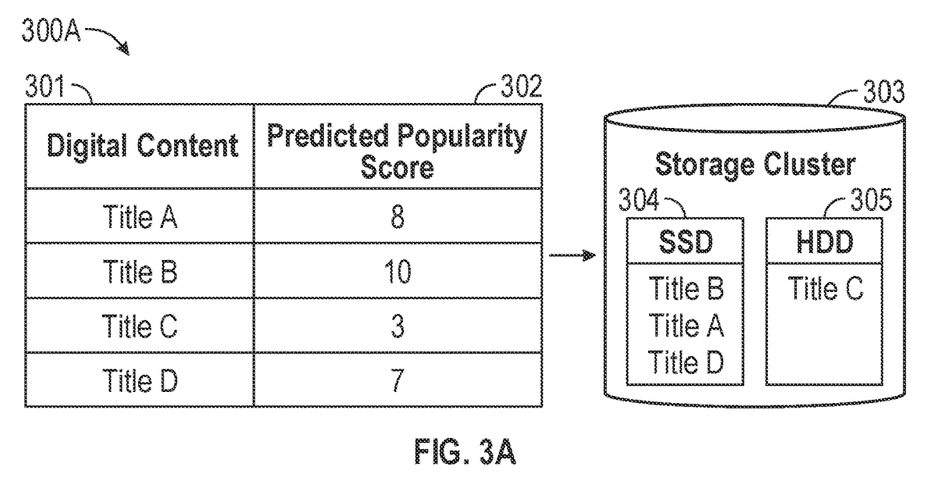
FIGS. 3A & 3B illustrate embodiments in which different media titles are assigned a predicted popularity score and are stored accordingly.
Figure 3B:
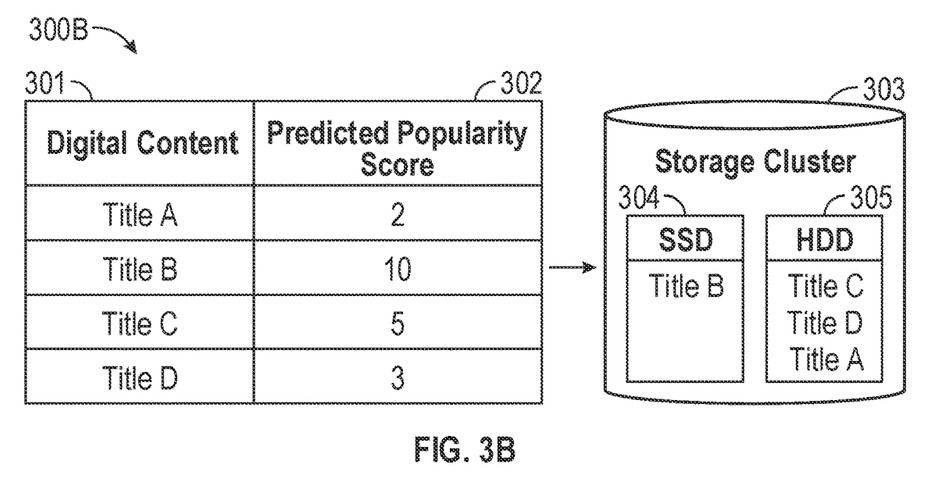

The digital content allocating module 112 then allocates the digital content 113 on the SSDs 121 and/or HDDs 122 of the storage cluster 120. The allocation is performed in a manner which ensures that the digital content 113 predicted to have higher popularity by module 108 is placed on storage media types with higher throughput amounts according to the cluster hardware information (e.g., placed on SSDs), and digital content 113 predicted to have lower popularity is placed on storage media types with lower throughput amounts (e.g., HDDs). FIGS. 3A and 3B illustrate this concept in greater detail.

FIG. 3A illustrates a chart 300A in which digital content (four titles in this Example: Titles A, B, C, and D) are placed on a storage cluster 303 according to a predicted popularity score 302. While traditional systems would look solely at total storage capacity and place content evenly over SSD drives (with a typical throughput of 80 Gbps) and HDD drives (with a typical throughput of 15 Gbps), the embodiments described herein place digital content on storage cluster drives in a manner that positions more popular data on higher-throughput storage media, and less popular digital content on lower-throughput storage media. In some cases, the data popularity determining module 108 of FIG. 1 is configured to calculate the popularity information 109 according to various data popularity criteria 125. In other cases, the accessing module 107 simply accesses popularity information 109 that was generated by another computer system or by another entity.

The data popularity criteria 125 may encompass a wide variety of different criteria that indicate whether a media item will be popular (i.e., whether the media item will be downloaded, streamed, or otherwise accessed on a regular, frequent basis, or on an irregular, infrequent basis). In some cases, for example, the data popularity criteria 125 include indications of who produced the media item, how many followers the media item's producer has, how many people have watched or accessed previous media items produced by a given user, or how many people have watched similar movies or tv shows, or how many people have accessed similar media items (e.g., similar title, genre, actors, theme, time period, or other similarities). Other indicators of a media item's predicted popularity may also be used, either alone or in combination with the above-listed criteria. In some cases, the data popularity criteria apply to a single storage media cluster or, in other cases, apply to multiple different (perhaps distributed) storage media clusters. Thus, in cases where multiple different storage clusters are distributed in various locations throughout the world, each data storage cluster may have its own data popularity criteria that governs which media items are popular in that region or country.

In FIG. 3A, Title A from digital content 301 is assigned by the data popularity determining module 108 a predicted popularity score 302 of "8." Title B is assigned a "10," Title C is assigned a score of "3," and Title D is assigned a score of "7" on a scale where 10 indicates a high predicted popularity and one indicates a low predicted popularity. Thus, because Title B is assigned the highest predicted popularity score 302, according to the popularity criteria, the digital content allocating module 112 of FIG. 1 will first place Title B on SSD 304 of storage cluster 303, as the SSD has higher throughput and can thus service more simultaneous users. Next, the digital content allocating module 112 will place Title A on the SSD 304, and then Title D. Because Title C is predicted to have a relatively low popularity score, with respect to the other media items, Title C is placed on the HDD 305, which has a lower throughput. This allocation assumes that SSD 304 has sufficient storage capacity to hold all three of Titles A, B, and D. If the SSD 304 did not have sufficient storage capacity to hold all three titles, the highest ranked titles would be allocated to the SSD according to available storage space, and the lower ranked titles (e.g., Title D) would be placed on the HDD 305. Moreover, if time were to pass and one of the titles did not end up being as popular as predicted, or ended up being more popular than predicted, the digital content allocating module 112 would reallocate the media items so that the more popular media items would be continually repositioned to the higher-throughput storage media.

Moreover, in some embodiments, an administrator 110 or other user establishes a predicted popularity threshold below which the associated media items are automatically assigned to the lower-throughput storage media. Thus, for example, if administrator 110 establishes, via input 111, that any media item receiving a popularity score of "5" or lower is automatically assigned to the lower-throughput storage media (e.g., HDD 305), then in FIG. 3B, Titles A, C, and D will all be placed on the HDD 305 because they each have a popularity score of "5" or lower. Because Title B has a popularity score 302 of "10," it is above the cutoff threshold and is placed on the higher-throughput storage media (e.g., SSD 304).

Figure 4:
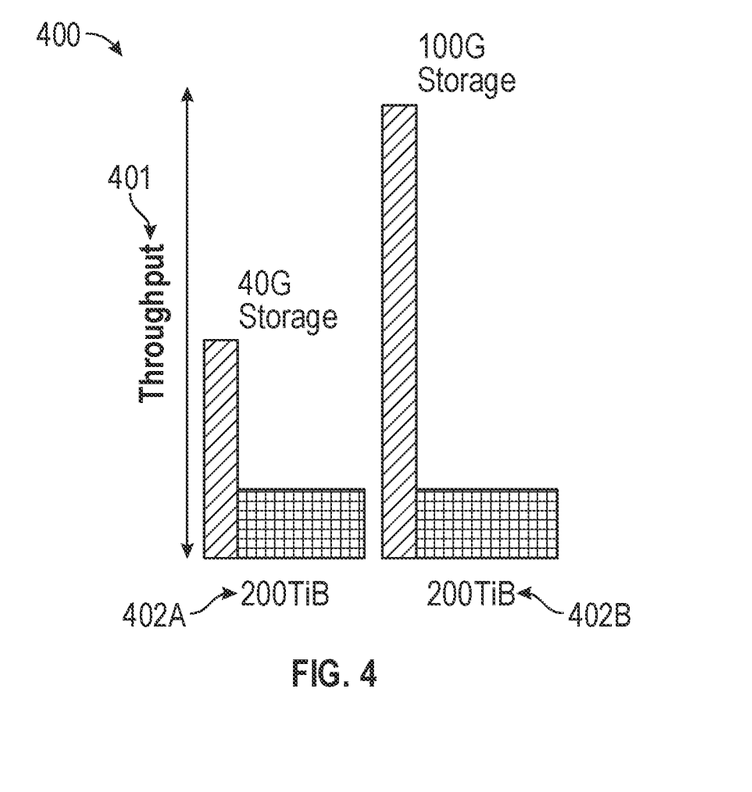
FIG. 4 illustrates an embodiment contrasting different types of storage types and throughput rates.

FIG. 4 illustrates an embodiment 400 in which digital content is allocated onto two different storage clusters, 402A and 402B. Data storage cluster 402A has 40 GB of SSD or Flash storage and 200 TiB of HDD storage, while storage cluster 402B has 100 GB of SSD or Flash storage and 200 TiB of HDD storage. In this example, in traditional storage systems, digital content allocated to storage cluster 402B with 100 GB of storage would be roughly 2.5× as popular as digital content allocated to storage cluster 402A. Traditional systems would treat the SSD and HDD storage media as being the same, and would allocate digital content solely based on total storage size or data throughput 401. As a result, more content would be stored on storage cluster 402B. Because the data would be disproportionately distributed in this case, the storage cluster 402B would need to shed data traffic, while storage cluster 402A would be underutilized.

Figure 5:
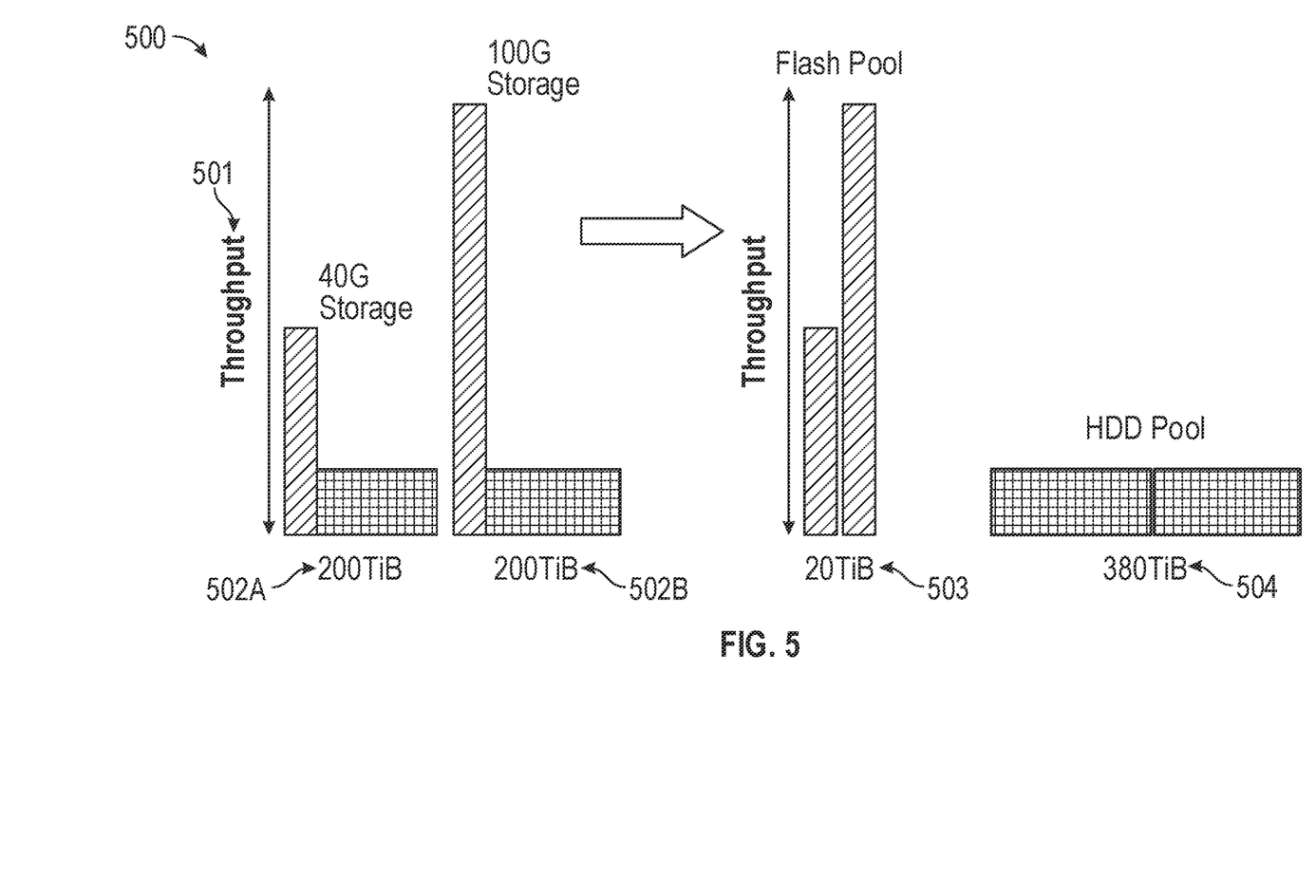
FIG. 5 illustrates an embodiment contrasting hard disk storage pools with solid state storage pools.

FIG. 5, on the other hand, illustrates an embodiment 500 in which the systems described herein place digital content in a manner that optimizes, and load balances each media type separately. This allows more efficient clustering of different types of storage hardware (e.g., combinations of SSD, HDD, NVMe, etc.), and allows popular content to be placed in a manner where each storage media type will attract data traffic (e.g., streaming or downloading) in proportion to its throughput capabilities. Thus, in FIG. 5, a traditional clustering system that may include storage clusters 502A and 502B (which may be the same as or similar to storage clusters 402A and 402B of FIG. 4) may be changed or converted to a more advanced, more efficient storage system that includes a pool 503 of high-throughput (501) SSD or similar drives and a pool 504 of lower-throughput drives that includes HDDs or other lower-throughput storage media. In this manner, digital content that is predicted to be more popular is then placed on the high-throughput pool 503, which is capable of serving much more data to more users, and digital content that is predicted to be less popular is placed on the lower-throughput pool 504, which serves the data in a slower manner to a smaller number of users.

Figure 6:
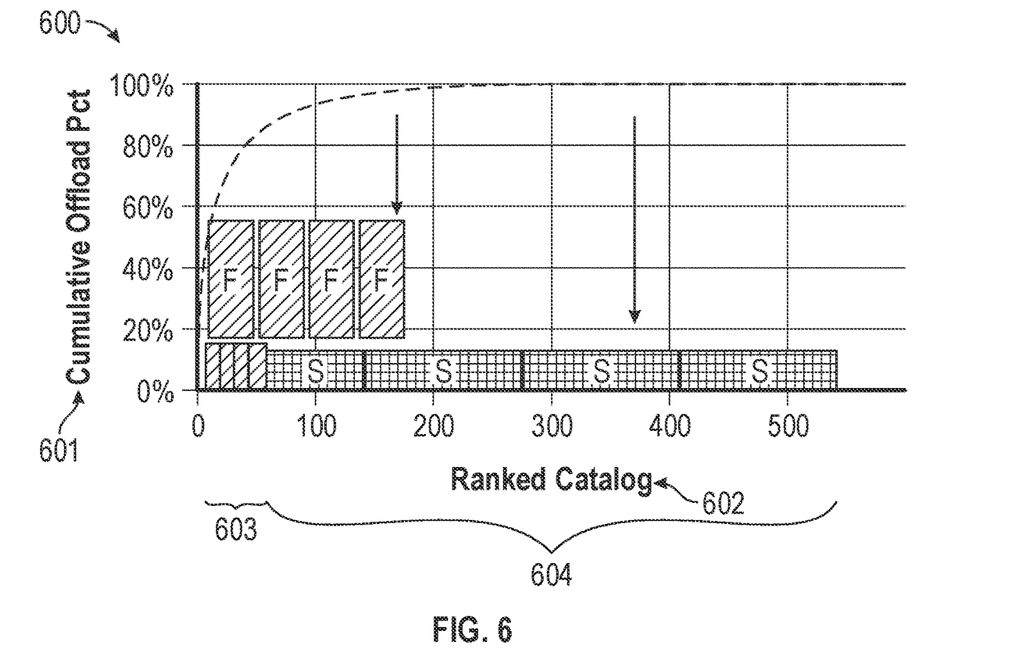
FIG. 6 illustrates an embodiment in which solid state storage is used for a specified percentage of a ranked catalog of media titles.

FIG. 6 illustrates an embodiment 600 in which a ranked catalog 602 of media items is shown from items 1-500+, where one is this highest ranked, or most popular item, and the remaining media items are less popular, as shown on the x-axis. The y-axis indicates the relative amount of media items (or other data) that may be stored in traditional systems, such as that shown in FIG. 4. In the embodiment 600 of FIG. 6, only the first ~50 media items are stored in Flash, SSD, or other high-throughput storage (as indicated by 603), while the remaining ~400 media items in the ranked catalog 602 are stored on HDD or other low-throughput storage (as indicated by 604). In this case, a relatively high cumulative offload 601 is present, with an increased amount of data being offloaded to lower-throughput storage clusters 604.

Figure 7:
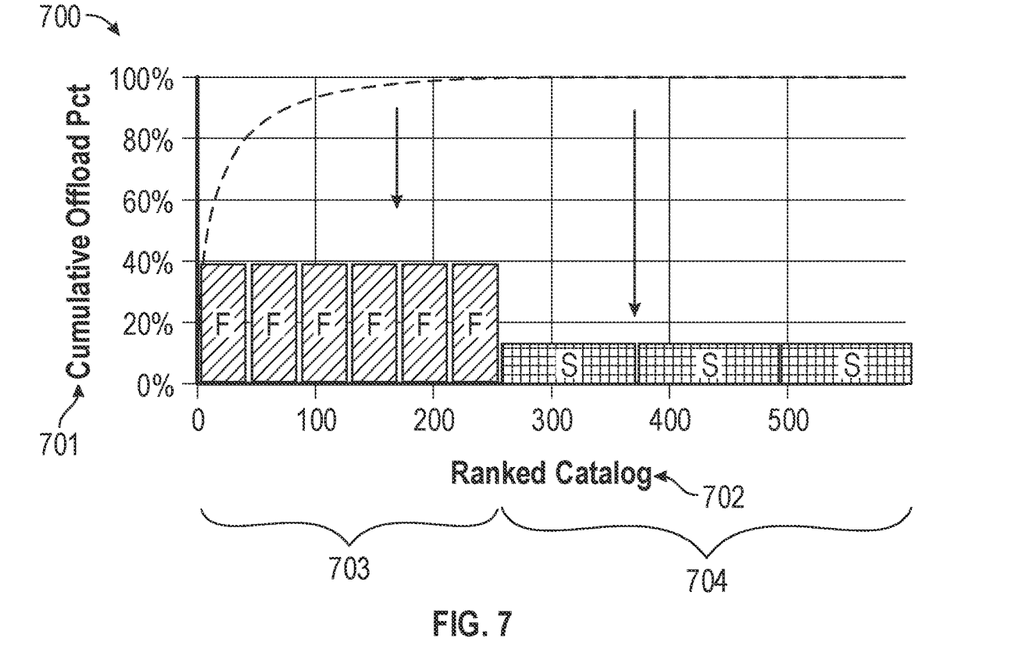
FIG. 7 illustrates an embodiment in which solid state storage is used for an alternate specified percentage of a ranked catalog of media titles.

In contrast, by using the embodiments described herein, and as shown in embodiment 700 of FIG. 7, by allocating content onto different media types in proportion to their throughput capabilities, and by further allocating digital content according to a predicted popularity score, more of the higher ranked media items 703 (e.g., titles 1-250) are placed on high-throughput Flash or SSD drives, while lower ranked media items 704 (e.g., titles 251-550+) are placed on low-throughput HDD media. As can be seen in FIG. 7, many more high-popularity titles (as indicated in the ranked catalog 702) are placed on high-throughput storage, while a much smaller number of titles are moved or offloaded to lower-throughput storage (as indicated by the cumulative offload percentage 701).

Accordingly, by predicting the popularity of a given data item before placing it in a data store, and by identifying which types of hardware storage devices are available for storing the data item, the embodiments herein allow for optimal initial placement of data. The embodiments described herein also allow that data to be moved at a later time if the predicted popularity score proves to be too high or too low. By placing the media items according to a predicted popularity score, first on higher-throughput storage devices and then on lower-throughput storage devices, the amount of data that is moved between the SSDs and HDDS (i.e., often referred to as "churn") is minimized. This prevents the storage devices from having to spend time transferring data from SSD to HDD or vice versa, and allows the data storage cluster to continually serve the most popular content from the fastest data storage devices.

As noted above, in at least some embodiments, digital content is placed on the various types of storage media proactively before receiving measured popularity data indicating actual data access rates for the digital content. Thus, in FIG. 1, for example, the digital content allocating module 112 places digital content 113 on SSDs 121 and/or HDDs 122 proactively based on the popularity of the digital content as determined by the popularity determining module 108. The digital content allocating module 112 allocates the digital content 113 without knowing whether the digital content will actually be popular or not. Rather, the digital content allocating module 112 relies on the data popularity criteria 125 informing the popularity determining module 108 to make a reasonable prediction. By placing the digital content 113 on the appropriate storage media 123 the first time, rather than moving it later, the systems described herein will reduce churn, and leave the storage media drives to focus solely on serving data, rather than diverting time away from serving data to re-write data to faster- or slower-throughput storage media. Accordingly, in this manner, proactive placement of the digital content 113 based on the predicted popularity information 109 avoids movement of the digital content between storage media types (e.g., between SSDs 121 and HDDs 122). Moreover, proactive placement of the digital content 113 according to the predicted popularity information 109 also avoids movement of the digital content across storage clusters (e.g., moving the data from storage cluster 120 to another, perhaps remote storage cluster).

Subsequently, the computer system 101 may receive or otherwise access real-time usage information indicating how often each piece of digital content (or other data) is being requested and served out by the storage cluster 120. In such cases, if a piece of digital content 113 that was initially placed on the SSDs 121 turns out not to be as popular as predicted, that content will be moved to the HDDs 122. And, conversely, if a piece of digital content 113 that was initially placed on the HDDs 122 turns out to be more popular than predicted, that content will be moved to the SSDs 121. This ensures that the most popular content is being serviced by the storage media with the highest throughput, regardless of where the content was initially placed.

In some cases, the digital content allocating module 112 allocates the digital content 113 onto the various types of storage media 123 within the storage cluster 120 according to a linear programming optimization. In at least some embodiments, a linear programming optimization is used to ensure that resources are properly and efficiently used within a system. In some cases, for example, when working with privately owned, third-party storage clusters, the linear programming module 118 of computer system 101 implements linear programming optimizations 119 to optimize data storage across multiple different nodes of the third-party storage clusters. Moreover, the linear programming optimizations 119 may be used to resolve tensions between reading and writing operations in the storage cluster and computationally intensive central processing unit (CPU) tasks. In some cases, these tasks are apt to consume each other's resources disproportionately. In such cases, linear programming optimizations 119 are used to ensure that the various reading, writing, and CPU resources of the storage cluster are used in an optimally efficient manner.

At least in some cases, linear programming optimization is also applied to determine what proportion of popularity ranked content goes in which media storage devices. For example, if the computer system 101 has to place 10 TB of popular content in a first SSD (SSD1) and in a second SSD (SSD2), then linear programming optimization is performed based on the capability of those drives. For instance, if SSD1 has a higher data throughput than SSD2, the computer system 101 will place a higher percentage of the 10 TB (e.g., (60% or six TB of content)) on SSD1 and will place the other 40% or four TB on SSD2.

Still further, in some embodiments, when this content is allocated to various storage media (e.g., SSD1 and SSD2 in the example above), the computer system 101 allocates the content using consistent hashing. For example, to prevent movement of similar popular content across different similar storage media, the computer system 101 applies consistent hashing to place the content deterministically in those storage media. In one example, for instance, the computer system 101 places similar popular content A and B in SSD1 and SSD2. In this example, the two possible solutions for digital content placement are A→SSD1, B→SSD2 and A→SSD2, B→SSD1. Using consistent hashing will provide one deterministic answer. If, for example, consistent hashing determines A→SSD1 and B→SSD2 is proper, then each time the computer system repeats this process, the result will be the same (i.e., A→SSD1 and B→SSD2). This will avoid churn within the system.

In some embodiments, the digital content allocating module 112 of computer system 101 is configured to replicate the digital content 113 on the various types of storage media 123 within the storage cluster 120 in a manner that allows load-balancing between cluster nodes. Thus, for instance, if one cluster or one cluster node is being hit especially hard with requests to serve a specific title (e.g., a newly released title), that digital content 113 is replicated on other cluster nodes or on other clusters to provide load balancing for that media item. Once the media item has been replicated on the other clusters or cluster nodes, those clusters/nodes will be able to serve the media item, thereby dividing the servicing load among the clusters/nodes that have the replicated data. Such replication on the various types of storage media 123 within the storage cluster 120 also provides a fault tolerance feature, as at least some of the media items are replicated across multiple storage media clusters or cluster nodes. Each of these clusters or nodes also functions as a backup if another cluster or node fails. Accordingly, data replication across different storage clusters or cluster nodes provides both load balancing and fault tolerance for media files across cluster nodes and across disparate data storage clusters.

When new storage clusters come online, or when new cluster nodes come online within a given storage cluster (e.g., within storage cluster 120), the computer system 101 may send a query 114 to the new cluster or node requesting hardware information for the types of hardware storage media in that cluster or node. The cluster then provides a real-time response 115 identifying the various types of storage media within that cluster or cluster node. In this manner, the computer system 101 will stay up to date any time new nodes come online, or when hard drives are replaced within a cluster or are added to a storage cluster. In responding to this query 114, the storage cluster or storage nodes also indicate the amount of data throughput for each identified type of storage media. As such, the computer system 101 has a continually up-to-date picture of which storage media are implemented in each storage cluster, and what the throughput is for each media type. In some cases, the SSDs and HDDs of a cluster will deteriorate and will lose some of the reading and/or writing throughput capacity. As such, the throughput measurement is, in at least some cases, a real-time throughput measurement for each identified type of storage media.

In at least some embodiments, some or all of the digital content 113 is proactively cached on the different types of storage media 123 within the storage cluster 120 based on the popularity information. This proactive caching stores at least a portion of the data in cache memory for faster retrieval and provisioning to clients. The cache may include NVMe, SSD, or other high-throughput memory.

Accordingly, in this manner, digital content may be proactively allocated to different types of hardware storage media based on the types of storage media available in a given data storage cluster. The systems described herein use various data popularity criteria to predict which media items or other data will be the most popular, and will then proactively allocate the most popular media items to the hardware storage media that is most capable of handling the incoming requests for the popular media items. This, in turn, limits churn, and provides the most efficient means of quickly serving data to requesting clients.

EXAMPLE EMBODIMENTS

1. A computer-implemented method comprising: accessing cluster hardware information that identifies at least two different types of storage media within a cluster and provides an indication of a respective amount of data throughput for each identified type of storage media, accessing popularity information for one or more portions of digital content that are to be stored in the cluster, the popularity information indicating how often the digital content is predicted to be accessed over a specified future period of time, and allocating the digital content on the at least two different types of storage media within the cluster according to the popularity information, such that digital content predicted to have higher popularity is placed on storage media types with higher throughput amounts according to the cluster hardware information, and digital content predicted to have lower popularity is placed on storage media types with lower throughput amounts, as indicated by the cluster hardware information.

2. The computer-implemented method of claim 1, wherein one of the at least two different types of storage media within the cluster comprises solid state drives (SSDs).

3. The computer-implemented method of claim 1, wherein one of the at least two different types of storage media within the cluster comprises hard disk drives (HDDs).

4. The computer-implemented method of claim 1, wherein a plurality of SSDs from a first cluster and a plurality of HDDs from a second cluster are merged into the cluster onto which the digital content is to be stored.

5. The computer-implemented method of claim 1, further comprising calculating the popularity information according to one or more data popularity criteria.

6. The computer-implemented method of claim 5, wherein the data popularity criteria apply to multiple different clusters of storage media.

7. The computer-implemented method of claim 5, wherein the data popularity criteria are specific to the cluster onto which the digital content is to be stored.

8. The computer-implemented method of claim 1, wherein the digital content is placed on the at least two different types of storage media proactively before receiving measured popularity data indicating actual data access rates for the digital content.

9. The computer-implemented method of claim 9, wherein proactive placement of the digital content according to the predicted popularity information avoids movement of the digital content between storage media types.

10. The computer-implemented method of claim 9, wherein proactive placement of the digital content according to the predicted popularity information avoids movement of the digital content across storage clusters.

11. A system comprising: at least one physical processor, and physical memory comprising computer-executable instructions that, when executed by the physical processor, cause the physical processor to: access cluster hardware information that identifies at least two different types of storage media within a cluster and provides an indication of a respective amount of data throughput for each identified type of storage media, access popularity information for one or more portions of digital content that are to be stored in the cluster, the popularity information indicating how often the digital content is predicted to be accessed over a specified future period of time, and allocate the digital content on the at least two different types of storage media within the cluster according to the popularity information, such that digital content predicted to have higher popularity is placed on storage media types with higher throughput amounts according to the cluster hardware information, and digital content predicted to have lower popularity is placed on storage media types with lower throughput amounts, as indicated by the cluster hardware information.

12. The system of claim 11, wherein the digital content is allocated on the at least two different types of storage media within the cluster according to one or more linear programming optimizations.

13. The system of claim 11, wherein the digital content is replicated on the at least two different types of storage media within the cluster in a manner that allows load-balancing between cluster nodes.

14. The system of claim 11, wherein the digital content is replicated on the at least two different types of storage media within the cluster in a manner that allows fault tolerance across a plurality of storage media clusters.

15. The system of claim 11, wherein the system sends a request for hardware information to the cluster and receives a reply identifying the at least two different types of storage media within the cluster.

16. The system of claim 11, wherein the amount of data throughput for each identified type of storage media comprises a current, real-time throughput measurement for each identified type of storage media.

17. The system of claim 11, wherein the one or more portions of digital content are proactively cached on the at least two different types of storage media within the cluster according to the popularity information.

18. The system of claim 11, wherein a first cluster comprising SSDs is merged with a second cluster comprising both SSDs and HDDs, and wherein the SSD storage media and the HDD storage media are used simultaneously within the combined first and second clusters.

19. The system of claim 18, wherein allocating the digital content on the first and second clusters avoids duplicating digital content stored on the SSDs of the first cluster on the SSDs of the second cluster.

20. A non-transitory computer-readable medium comprising one or more computer-executable instructions that, when executed by at least one processor of a computing device, cause the computing device to: access cluster hardware information that identifies at least two different types of storage media within a cluster and provides an indication of a respective amount of data throughput for each identified type of storage media, access popularity information for one or more portions of digital content that are to be stored in the cluster, the popularity information indicating how often the digital content is predicted to be accessed over a specified future period of time, and allocate the digital content on the at least two different types of storage media within the cluster according to the popularity information, such that digital content predicted to have higher popularity is placed on storage media types with higher throughput amounts according to the cluster hardware information, and digital content predicted to have lower popularity is placed on storage media types with lower throughput amounts, as indicated by the cluster hardware information.

Figure 8:
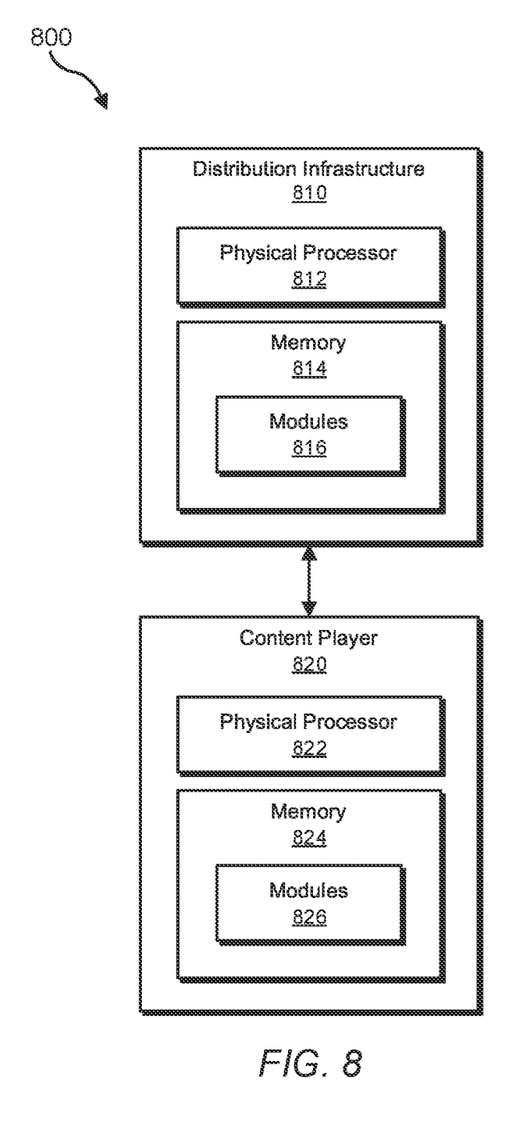
FIG. 8 is a block diagram of an exemplary content distribution ecosystem.
Figure 10:
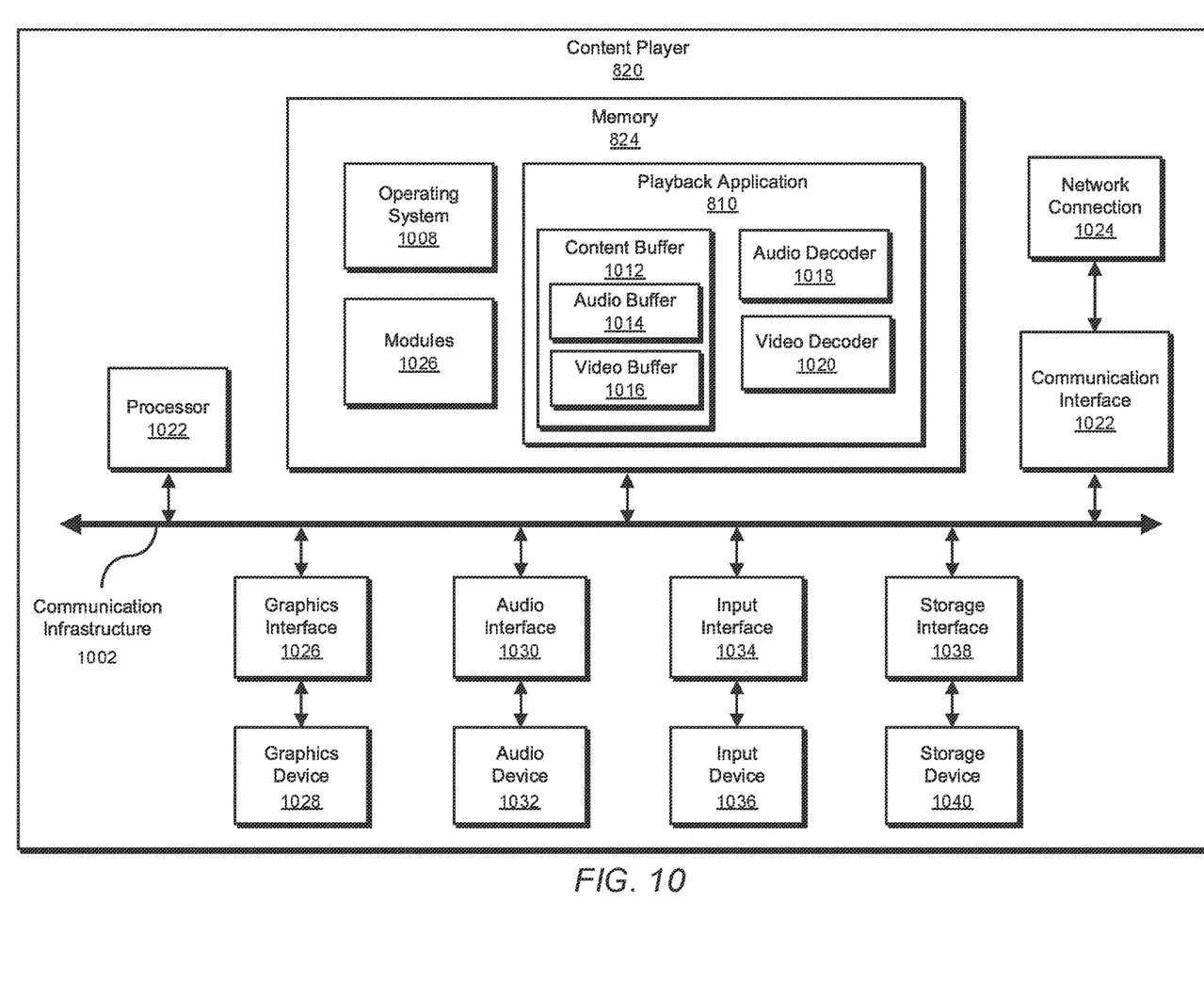
FIG. 10 is a block diagram of an exemplary content player within the content distribution ecosystem shown in FIG. 8.

The following will provide, with reference to FIG. 8, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-7.

FIG. 8 is a block diagram of a content distribution ecosystem 800 that includes a distribution infrastructure 810 in communication with a content player 820. In some embodiments, distribution infrastructure 810 is configured to encode data at a specific data rate and to transfer the encoded data to content player 820. Content player 820 is configured to receive the encoded data via distribution infrastructure 810 and to decode the data for playback to a user. The data provided by distribution infrastructure 810 includes, for example, audio, video, text, images, animations, interactive content, haptic data, virtual or augmented reality data, location data, gaming data, or any other type of data that is provided via streaming.

Distribution infrastructure 810 generally represents any services, hardware, software, or other infrastructure components configured to deliver content to end users. For example, distribution infrastructure 810 includes content aggregation systems, media transcoding and packaging services, network components, and/or a variety of other types of hardware and software. In some cases, distribution infrastructure 810 is implemented as a highly complex distribution system, a single media server or device, or anything in between. In some examples, regardless of size or complexity, distribution infrastructure 810 includes at least one physical processor 812 and at least one memory device 814. One or more modules 816 are stored or loaded into memory 814 to enable adaptive streaming, as discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 includes a physical processor 822, memory 824, and one or more modules 826. Some or all of the adaptive streaming processes described herein is performed or enabled by modules 826, and in some examples, modules 816 of distribution infrastructure 810 coordinate with modules 826 of content player 820 to provide adaptive streaming of digital content.

In certain embodiments, one or more of modules 816 and/or 826 in FIG. 8 represent one or more software applications or programs that, when executed by a computing device, cause the computing device to perform one or more tasks. For example, and as will be described in greater detail below, one or more of modules 816 and 826 represent modules stored and configured to run on one or more general-purpose computing devices. One or more of modules 816 and 826 in FIG. 8 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 812 and 822 generally represent any type or form of hardware-implemented processing unit capable of interpreting and/or executing computer-readable instructions. In one example, physical processors 812 and 822 access and/or modify one or more of modules 816 and 826, respectively. Additionally or alternatively, physical processors 812 and 822 execute one or more of modules 816 and 826 to facilitate adaptive streaming of digital content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 stores, loads, and/or maintains one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
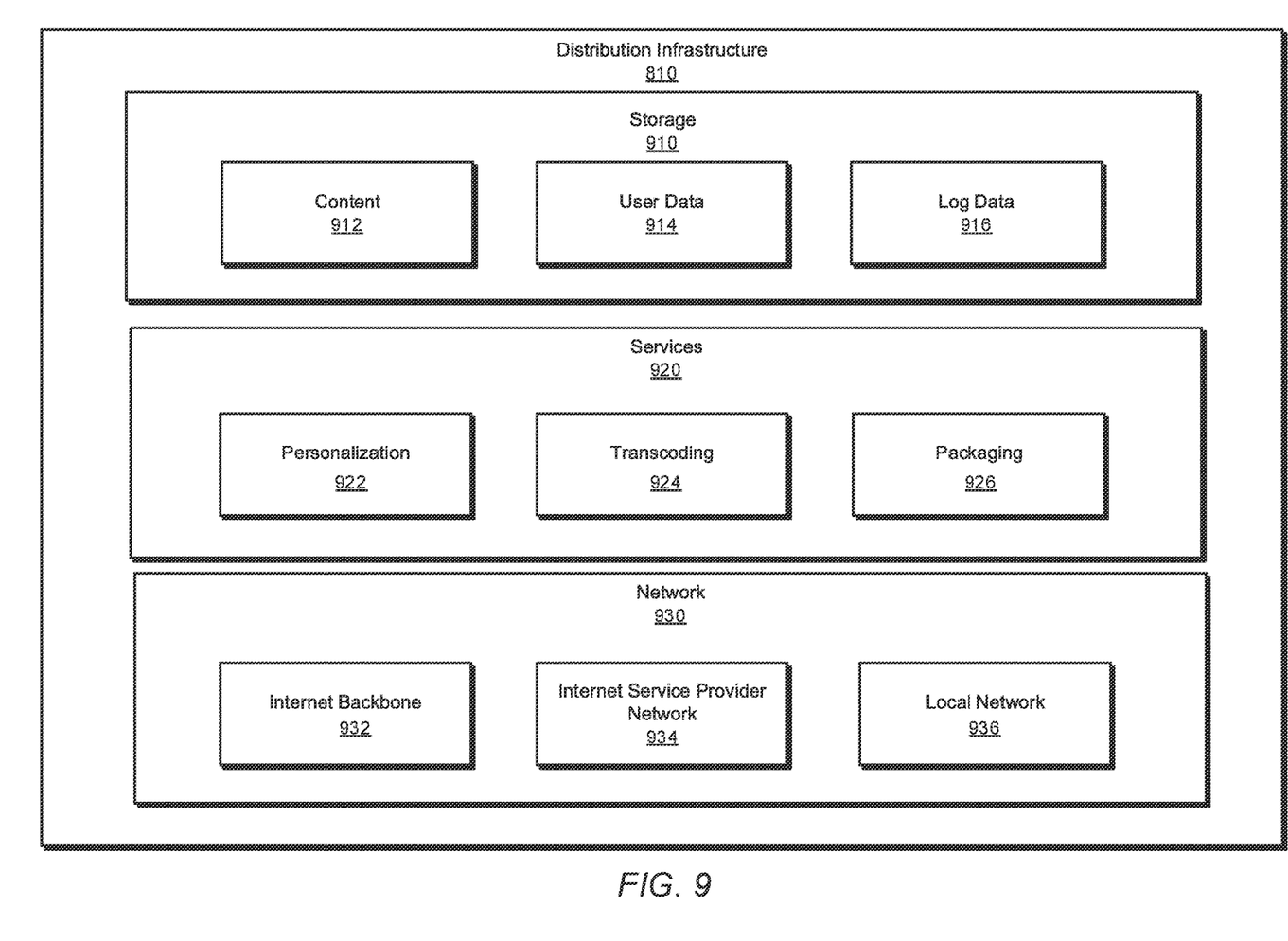
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 includes storage 910, services 920, and a network 930. Storage 910 generally represents any device, set of devices, and/or systems capable of storing content for delivery to end users. Storage 910 includes a central repository with devices capable of storing terabytes or petabytes of data and/or includes distributed storage systems (e.g., appliances that mirror or cache content at Internet interconnect locations to provide faster access to the mirrored content within certain regions). Storage 910 is also configured in any other suitable manner.

As shown, storage 910 may store a variety of different items including content 912, user data 914, and/or log data 916. Content 912 includes television shows, movies, video games, user-generated content, and/or any other suitable type or form of content. User data 914 includes personally identifiable information (PII), payment information, preference settings, language and accessibility settings, and/or any other information associated with a particular user or content player. Log data 916 includes viewing history information, network throughput information, and/or any other metrics associated with a user's connection to or interactions with distribution infrastructure 810.

Services 920 includes personalization services 922, transcoding services 924, and/or packaging services 926. Personalization services 922 personalize recommendations, content streams, and/or other aspects of a user's experience with distribution infrastructure 810. Encoding services 924 compress media at different bitrates which, as described in greater detail below, enable real-time switching between different encodings. Packaging services 926 package encoded video before deploying it to a delivery network, such as network 930, for streaming.

Network 930 generally represents any medium or architecture capable of facilitating communication or data transfer. Network 930 facilitates communication or data transfer using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 includes an Internet backbone 932, an internet service provider 934, and/or a local network 936. As discussed in greater detail below, bandwidth limitations and bottlenecks within one or more of these network segments triggers video and/or audio bit rate adjustments.

FIG. 10 is a block diagram of an exemplary implementation of content player 820 of FIG. 8. Content player 820 generally represents any type or form of computing device capable of reading computer-executable instructions. Content player 820 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 includes a communication infrastructure 1002 and a communication interface 1022 coupled to a network connection 1024. Content player 820 also includes a graphics interface 1026 coupled to a graphics device 1028, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 stores and/or loads an operating system 1008 for execution by processor 822. In one example, operating system 1008 includes and/or represents software that manages computer hardware and software resources and/or provides common services to computer programs and/or applications on content player 820.

Operating system 1008 performs various system management functions, such as managing hardware components (e.g., graphics interface 1026, audio interface 1030, input interface 1034, and/or storage interface 1038). Operating system 1008 also provides process and memory management models for playback application 1010. The modules of playback application 1010 includes, for example, a content buffer 1012, an audio decoder 1018, and a video decoder 1020.

Playback application 1010 is configured to retrieve digital content via communication interface 1022 and play the digital content through graphics interface 1026. Graphics interface 1026 is configured to transmit a rendered video signal to graphics device 1028. In normal operation, playback application 1010 receives a request from a user to play a specific title or specific content. Playback application 1010 then identifies one or more encoded video and audio streams associated with the requested title. After playback application 1010 has located the encoded streams associated with the requested title, playback application 1010 downloads sequence header indices associated with each encoded stream associated with the requested title from distribution infrastructure 810. A sequence header index associated with encoded content includes information related to the encoded sequence of data included in the encoded content.

In one embodiment, playback application 1010 begins downloading the content associated with the requested title by downloading sequence data encoded to the lowest audio and/or video playback bitrates to minimize startup time for playback. The requested digital content file is then downloaded into content buffer 1012, which is configured to serve as a first-in, first-out queue. In one embodiment, each unit of downloaded data includes a unit of video data or a unit of audio data. As units of video data associated with the requested digital content file are downloaded to the content player 820, the units of video data are pushed into the content buffer 1012. Similarly, as units of audio data associated with the requested digital content file are downloaded to the content player 820, the units of audio data are pushed into the content buffer 1012. In one embodiment, the units of video data are stored in video buffer 1016 within content buffer 1012 and the units of audio data are stored in audio buffer 1014 of content buffer 1012.

A video decoder 1020 reads units of video data from video buffer 1016 and outputs the units of video data in a sequence of video frames corresponding in duration to the fixed span of playback time. Reading a unit of video data from video buffer 1016 effectively de-queues the unit of video data from video buffer 1016. The sequence of video frames is then rendered by graphics interface 1026 and transmitted to graphics device 1028 to be displayed to a user.

An audio decoder 1018 reads units of audio data from audio buffer 1014 and outputs the units of audio data as a sequence of audio samples, generally synchronized in time with a sequence of decoded video frames. In one embodiment, the sequence of audio samples is transmitted to audio interface 1030, which converts the sequence of audio samples into an electrical audio signal. The electrical audio signal is then transmitted to a speaker of audio device 1032, which, in response, generates an acoustic output.

In situations where the bandwidth of distribution infrastructure 810 is limited and/or variable, playback application 1010 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1026 is configured to generate frames of video data and transmit the frames of video data to graphics device 1028. In one embodiment, graphics interface 1026 is included as part of an integrated circuit, along with processor 822. Alternatively, graphics interface 1026 is configured as a hardware accelerator that is distinct from (i.e., is not integrated within) a chipset that includes processor 822.

Graphics interface 1026 generally represents any type or form of device configured to forward images for display on graphics device 1028. For example, graphics device 1028 is fabricated using liquid crystal display (LCD) technology, cathode-ray technology, and light-emitting diode (LED) display technology (either organic or inorganic). In some embodiments, graphics device 1028 also includes a virtual reality display and/or an augmented reality display. Graphics device 1028 includes any technically feasible means for generating an image for display. In other words, graphics device 1028 generally represents any type or form of device capable of visually displaying information forwarded by graphics interface 1026.

As illustrated in FIG. 10, content player 820 also includes at least one input device 1036 coupled to communication infrastructure 1002 via input interface 1034. Input device 1036 generally represents any type or form of computing device capable of providing input, either computer or human generated, to content player 820. Examples of input device 1036 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 820 also includes a storage device 1040 coupled to communication infrastructure 1002 via a storage interface 1038. Storage device 1040 generally represents any type or form of storage device or medium capable of storing data and/or other computer-readable instructions. For example, storage device 1040 is a magnetic disk drive, a solid-state drive, an optical disk drive, a flash drive, or the like. Storage interface 1038 generally represents any type or form of interface or device for transferring data between storage device 1040 and other components of content player 820.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to determine where to store data, and use the result of the transformation to store the data in the determined location. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing cluster hardware information that identifies at least two different types of storage media within a cluster and provides an indication of a respective numerical amount of data throughput capability for each identified type of storage media including a first numerical amount of data throughput capability for a first, higher-throughput storage media type and a second numerical amount of data throughput capability for a second, lower-throughput storage media type;
    accessing popularity information for one or more portions of digital content that are to be stored in the cluster, the popularity information indicating how often the digital content is predicted to be accessed over a specified future period of time within a specified geographic location; and
    allocating the digital content on the at least two different types of storage media within the cluster according to the popularity information for the specified geographic location and in a manner that is proportionate to the data throughput capability of the at least two different types of storage media, such that a proportionate numerical amount of digital content predicted to have higher popularity is placed on the first, higher-throughput storage media types, and a proportionate numerical amount of digital content predicted to have lower popularity is placed on the second, lower-throughput storage media types.

2. The computer-implemented method of claim 1, wherein one of the at least two different types of storage media within the cluster comprises solid state drives (SSDs).

3. The computer-implemented method of claim 1, wherein one of the at least two different types of storage media within the cluster comprises hard disk drives (HDDs).

4. The computer-implemented method of claim 1, wherein a plurality of SSDs from a first cluster and a plurality of HDDs from a second cluster are merged into the cluster onto which the digital content is to be stored.

5. The computer-implemented method of claim 1, further comprising calculating the popularity information according to one or more data popularity criteria.

6. The computer-implemented method of claim 5, wherein the data popularity criteria apply to multiple different clusters of storage media.

7. The computer-implemented method of claim 5, wherein the data popularity criteria are specific to the cluster onto which the digital content is to be stored.

8. The computer-implemented method of claim 1, wherein the digital content is placed on the at least two different types of storage media proactively before receiving measured popularity data indicating actual data access rates for the digital content.

9. The computer-implemented method of claim 8, wherein proactive placement of the digital content according to the predicted popularity information avoids movement of the digital content between storage media types.

10. The computer-implemented method of claim 8, wherein proactive placement of the digital content according to the predicted popularity information avoids movement of the digital content across storage clusters.

11. A system comprising:
at least one physical processor; and
physical memory comprising computer-executable instructions that, when executed by the physical processor, cause the physical processor to:
access cluster hardware information that identifies at least two different types of storage media within a cluster and provides an indication of a respective numerical amount of data throughput capability for each identified type of storage media including a first numerical amount of data throughput capability for a first, higher-throughput storage media type and a second numerical amount of data throughput capability for a second, lower-throughput storage media type;
access popularity information for one or more portions of digital content that are to be stored in the cluster, the popularity information indicating how often the digital content is predicted to be accessed over a specified future period of time within a specified geographic location; and
allocate the digital content on the at least two different types of storage media within the cluster according to the popularity information for the specified geographic location and in a manner that is proportionate to the data throughput capability of the at least two different types of storage media, such that a proportionate numerical amount of digital content predicted to have higher popularity is placed on the first, higher-throughput storage media types, and a proportionate numerical amount of digital content predicted to have lower popularity is placed on the second, lower-throughput storage media types.

12. The system of claim 11, wherein the digital content is allocated on the at least two different types of storage media within the cluster according to one or more linear programming optimizations.

13. The system of claim 11, wherein the digital content is replicated on the at least two different types of storage media within the cluster in a manner that allows load-balancing between cluster nodes.

14. The system of claim 11, wherein the digital content is replicated on the at least two different types of storage media within the cluster in a manner that allows fault tolerance across a plurality of storage media clusters.

15. The system of claim 11, wherein the system sends a request for hardware information to the cluster and receives a reply identifying the at least two different types of storage media within the cluster.

16. The system of claim 11, wherein the amount of data throughput for each identified type of storage media comprises a current, real-time throughput measurement for each identified type of storage media.

17. The system of claim 11, wherein the one or more portions of digital content are proactively cached on the at least two different types of storage media within the cluster according to the popularity information.

18. The system of claim 11, wherein a first cluster comprising SSDs is merged with a second cluster comprising both SSDs and HDDs, and wherein the SSDs and the HDDs are used simultaneously within the merged first and second clusters.

19. The system of claim 18, wherein allocating the digital content on the first and second clusters avoids duplicating digital content stored on the SSDs of the first cluster on the SSDs of the second cluster.

20. A non-transitory computer-readable medium comprising one or more computer-executable instructions that, when executed by at least one processor of a computing device, cause the computing device to:
access cluster hardware information that identifies at least two different types of storage media within a cluster and provides an indication of a respective numerical amount of data throughput capability for each identified type of storage media including a first numerical amount of data throughput capability for a first, higher-throughput storage media type and a second numerical amount of data throughput capability for a second, lower-throughput storage media type;
access popularity information for one or more portions of digital content that are to be stored in the cluster, the popularity information indicating how often the digital content is predicted to be accessed over a specified future period of time within a specified geographic location; and
allocate the digital content on the at least two different types of storage media within the cluster according to the popularity information for the specified geographic location and in a manner that is proportionate to the data throughput capability of the at least two different types of storage media, such that a proportionate numerical amount of digital content predicted to have higher popularity is placed on the first, higher-throughput storage media types, and a proportionate numerical amount of digital content predicted to have lower popularity is placed on the second, lower-throughput storage media types.

* * * * *